April 9, 1968     C. B. GODWIN     3,376,881

PISTON CONTROLLED PURE FLUID AMPLIFIER

Filed Feb. 13, 1964

Carroll B. Godwin,
*INVENTOR.*

BY Harry M. Saragovitz
Edward J. Kelly
Herbert Berl
Harold W. Hilton

United States Patent Office 3,376,881
Patented Apr. 9, 1968

3,376,881
PISTON CONTROLLED PURE FLUID AMPLIFIER
Carroll B. Godwin, Burkville, Ala., assignor to the United States of America as represented by the Secretary of the Army
Filed Feb. 13, 1964, Ser. No. 344,790
5 Claims. (Cl. 137—81.5)

The invention described herein may be manufactured and used by or for the Government for governmental purposes without the payment of any royalty thereon.

This invention relates to pure fluid amplifiers and particularly to mechanism disposed for diverting the direction of a fluid power stream by action of the fluid power stream itself.

There are many devices disposed for switching, controlling, deflecting, separating or otherwise redirecting a fluid power stream so that it may be utilized to perform a useful function. However, many of the devices have moving parts and require considerable force to open a duct once it is closed where high velocity of the stream is involved. Furthermore, most of these moving parts are positioned in the stream and the moving parts are, therefore, susceptible to corrosion and subsequent jamming.

There are other known fluid amplifiers in which a control stream of fluid is used to impinge on the sides of the fluid power stream, at or near a 90° angle therewith and the momentum of the control flow will cause the power jet to deflect. However, these devices require separate sources from which the control stream must be obtained.

The present invention overcomes such noted difficulties of diverting the stream by creating pressure differentials across the power jet to cause the power jet to be deflected. There are no moving parts to be moved about in the fluid power stream and thus the problem of opening and closing ducts is eliminated. The problem of jamming of the moving parts, due to corrosion and the problem of requiring a separate control stream is eliminated.

The fluid amplifier of the present invention includes a body provided with an inlet disposed in communication with a source of fluid under pressure. A chamber is disposed in the body in communication with a plurality of outlets to direct the flow of fluid thereto. A pair of cylinders are each disposed on opposite sides of the chamber in offset relation thereto. A piston is mounted in each cylinder for movement therein to compress the gas in one cylinder while expanding the gas in the other cylinder to create pressure differentials across the power jet and control the direction of flow thereof.

The apparatus of the present invention may be utilized in such applications as pneumatic pickoffs for inertial sensing elements such as gyros and accelerometers. It also provides a simple means to convert electrical or mechanical energy to pneumatic energy as required in the valving of hot gas. The apparatus is particularly advantageous in the valving of hot gases in that no moving parts are exposed to the extreme environment of the hot gas. Thus, the apparatus of the present invention may be used in missile guidance systems or for thrust vectoring in missiles.

A further advantage of the apparatus of the present invention is that no pressurized control medium is required in environments which approach standard atmospheric.

It is, therefore, an object of the present invention to provide a device for selectively directing a stream of fluid to one of a plurality of exit ports.

It is a further object of the present invention to provide a device for proportional and "on-off" control of the power stream of a pure fluid amplifier by differential pressures created across the power stream responsive to flow of the power stream.

It is a still further object of the present invention to provide such a device with means for creating the pressure differentials for selectively varying the direction of flow of the power stream.

Other objects, features and advantages of the present invention will become more readily apparent from the following description taken in conjunction with the accompanying drawings, in which.

Figure 1:
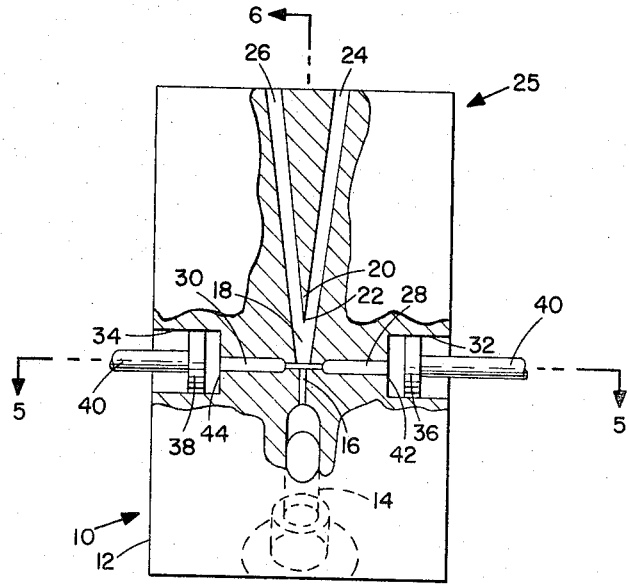
FIGURE 1 is a sectional plan view of my invention in which a pressure differential is created across the power stream by flow of the power stream itself.
Figure 2:
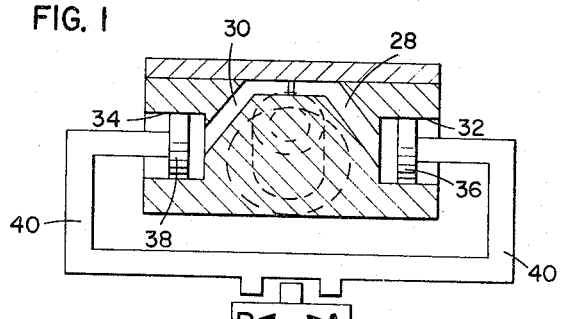
FIGURE 2 is a sectional view along line 2—2 of FIGURE 1.
Figure 3:
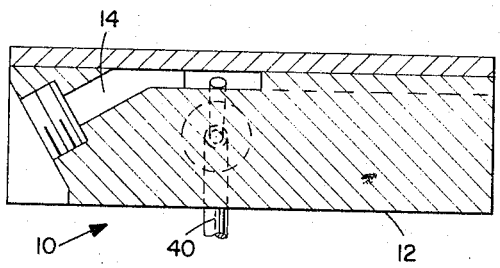
FIGURE 3 is a sectional view taken along line 3—3 of FIGURE 1.

As shown in FIGURES 1-3 the fluid amplifier 10 includes a body 12 having an inlet passageway 14 disposed for connection to a source of fluid under pressure. A nozzle 16 is disposed in communication with passageway 14 and with a chamber 18 provided in body 12. At a distance from a nozzle 16 is a splitter 20. Splitter 20 is provided with a leading knife edge 22 mounted directly on the center line with nozzle 16. A pair of exit ports 24 and 26 are disposed in communication with inlet passageway 14 and are open to the atmosphere at one end 25 of body 12. Ports 24 and 26 join at the edge 22 of the splitter to communicate with chamber 18 which extends to join the nozzle section 16.

A pair of offset orifices 28 and 30 are disposed in communication with chamber 18, on opposite sides thereof. Each of the orifices 28 and 30 have respectively disposed in communication therewith a pair of cylindrical apertures 32 and 34 having larger diameters than orifices 28 and 30. A pair of pistons 36 and 38 are respectively mounted in cylindrical apertures 32 and 34 and are connected to an actuator 39 by means of a rod 40. Pistons 36 and 38 are respectively mounted in apertures 32 and 34 for reciprocal movement therein. As illustrated in FIGURES 1 and 2 the pistons serve to seal off orifices 28 and 30 and apertures 32 and 34 to the atmosphere.

In operation, fluid is admitted to the amplifier through passageway 14 and flows toward splitter 22 directly on the centerline of the fluid flow (power jet). With pistons 36 and 38 in the position shown in FIGURE 1 (pistons 36 and 38 are equidistant from the inner walls 42 and 44 of cylinders 32 and 34 respectively) the power jet will be divided equally by splitter 22 and the fluid will flow out of both ports 24 and 26. As the fluid flows past the channels 28 and 30 leading into cylinders 32 and 34, particles of air will be entrained which causes the pressure in the cylinders to become lower.

If pistons 36 and 38 are moved simultaneously to the right (in the direction of arrow A, FIGURE 2), the pressure in cylinder 34 will increase due to compression of gases therein and the pressure in cylinder 32 will decrease due to the larger void created in cylinder 32 between piston 38 and wall 44 of cylinder 34.

The net result will be an instantaneous pressure differential across the power jet which diverts the total flow of the power jet into port 24. As the fluid flows through nozzle 16, chamber 18, and port 24, particles of air from aperture 28 and cylinder 32 will be entrained to produce substantially a vacuum therein. The power jet will remain in this position because the pressure differential still exists due to the entrainment of particles from outside the device through port 26 which maintains a high pressure on the left side of the power jet while the right side has attached to the wall due to the low pressure of this area.

To divert the stream to port 26, actuator 39 is energized to reverse the direction of movement of rod 40 in the direction of arrow B, FIGURE 2, and thus move pistons 36 and 38 to the left, creating a larger void in cylinder 34 between piston 36 and wall 42 and compressing the gas in cylinder 32, thus creating pressure differentials across the power jet and divert the total fluid flow through port 26 a vacuum is created in aperture 30 and cylinder 34 by fluid flow thereby, as discussed supra.

The actuator referred to hereinabove may be any of many types of devices capable of imparting reciprocal movement, such as pistons, vibrators, solenoids, etc.

It is to be understood that many modifications of the present invention may be resorted to by persons skilled in the art that are within the spirit and scope of the appended claims.

I claim:

1. A fluid amplifier disposed for controlling the direction of fluid flow therefrom comprising:
    (a) a body having a fluid inlet means supplied with a fluid to be controlled;
    (a) a plurality of outlets disposed for controlled fluid flow therethrough;
    (c) a chamber disposed in said body in communication with said inlet and said plurality of outlets; and
    (d) means disposed in said body in communication with said chamber to increase pressure on one side of said fluid flow and decrease pressure on the other side of said fluid flow, said means comprising a pair of cylindrical apertures, each of said apertures disposed in communication with said chamber on opposite sides thereof and said means disposed in said body includes a piston mounted in said apertures for reciprocal movement therein to selectively vary the pressure across the fluid flow to create pressure differentials across said fluid flow and thus control the direction of fluid flow through said outlets.

2. Apparatus as in claim 1 including a piston rod connected to said piston and to a mechanism for imparting reciprocal motion to said piston.

3. A device as set forth in claim 2 wherein said pistons are disposed for simultaneous movement in the same direction to increase pressure on one side of said fluid flow while simultaneously decreasing pressure on the other side of said fluid flow.

4. A device as set forth in claim 3 wherein sad piston containing apertures are disposed on opposite sides of said body and communicates with said chamber by a pair of apertures disposed in offset relation between said piston containing apertures and said chamber to maintain said pistons remote from said power stream.

5. A fluid amplifier control device, including: fluid inlet means supplied with a fluid to be controlled; fluid flow outlet means; control fluid means adjacent said inlet means and including an opening at one end of said control fluid means directed toward said inlet fluid flow; said control fluid means being sealed at an end opposite said opening by a piston to form variable volume chamber means; and movable means to vary said piston thereby causing said variable volume chamber means to create an output of fluid from said opening to control the direction of fluid flow in said outlet means.

References Cited

UNITED STATES PATENTS

| | | | |
|---|---|---|---|
| 3,144,037 | 8/1964 | Cargill et al. | 137—81.5 |
| 3,148,691 | 9/1964 | Greenblott | 137—81.5 |
| 3,176,703 | 4/1965 | Sparrow | 137—81.5 |

M. CARY NELSON, *Primary Examiner.*

SAMUEL SCOTT, *Examiner.*